United States Patent
Jang

(10) Patent No.: US 6,919,697 B2
(45) Date of Patent: Jul. 19, 2005

(54) POWER SUPPLY DEVICE AND LIQUID CRYSTAL DISPLAY DEVICE USING THE SAME

(75) Inventor: Hyeonyong Jang, Osan (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 10/608,361

(22) Filed: Jun. 26, 2003

(65) Prior Publication Data

US 2004/0056609 A1 Mar. 25, 2004

(30) Foreign Application Priority Data

Dec. 6, 2002 (KR) .................................. 10-2002-0077298

(51) Int. Cl.$^7$ .......................... H05B 37/02; H05B 39/04
(52) U.S. Cl. ...................... 315/291; 315/224; 315/276
(58) Field of Search ................................. 315/291, 300, 315/307, 308, 224, 274, 276, 282, 283, DIG. 5; 363/15, 34; H05B 37/02, 39/04

(56) References Cited

U.S. PATENT DOCUMENTS

| | | | |
|---|---|---|---|
| 5,731,652 A | * | 3/1998 | Shimada ................ 310/316.01 |
| 5,939,840 A | | 8/1999 | Nakagawa et al. ......... 315/307 |
| 6,531,830 B2 | * | 3/2003 | Akimoto et al. ............ 315/224 |
| 6,674,248 B2 | * | 1/2004 | Newman et al. ............ 315/247 |
| 2002/0030455 A1 | * | 3/2002 | Ghanem ..................... 315/291 |
| 2004/0113569 A1 | * | 6/2004 | Henry ......................... 315/307 |

FOREIGN PATENT DOCUMENTS

| | | | | |
|---|---|---|---|---|
| JP | 10288767 | 10/1998 | ........... G02F/1/133 |
| JP | 2001066569 | 3/2001 | ........... G02F/1/133 |
| JP | 2002244103 | 8/2002 | ........... G02F/1/133 |

* cited by examiner

*Primary Examiner*—Wilson Lee
*Assistant Examiner*—Trinh Vo Dinh
(74) *Attorney, Agent, or Firm*—Cantor Colburn LLP

(57) ABSTRACT

The present invention relates to a power supply device for a backlight and a liquid crystal device using the power supply device. The power supply device and the liquid crystal display device using the same according to the present invention can drive a fluorescent lamp while keeping luminance of the fluorescent lamp constant by applying voltages with different polarities to both ends of the fluorescent lamp, detecting a voltage proportional to a current flowing through the fluorescent lamp, and causing the detected voltage to be fedback. Therefore, there are advantages in that since a leakage current between the fluorescent lamp and a reflector is reduced, the luminance of the fluorescent lamp becomes uniform and the life of the fluorescent lamp is prolonged.

20 Claims, 6 Drawing Sheets

POWER SUPPLY DEVICE AND LIQUID CRYSTAL DISPLAY DEVICE USING THE SAME

BACKGROUND OF THE INVENTION

1. Field of the Invention

The present invention relates to a power supply device for a backlight and to a liquid crystal device using the same, and more particularly, to a power supply device comprising an oscillation control unit that controls the output of a direct current source input, a power driving unit that converts DC power output from the oscillation control unit into AC power, a power transforming unit that transforms the converted AC power, a sensing unit connected in series to one end of a lamp to sense a change of a power applied to the lamp, and a detection control unit that detects a difference between voltages of both ends of the sensing unit and provides a detected signal to the oscillation control unit.

2. Description of Related Art

Since a liquid crystal panel itself in a liquid crystal display device cannot emit light, it cannot be used in a place where there is no light. Therefore, a plurality of fluorescent lamps are used as a backlight for uniformly transferring light from the rear side of the liquid crystal panel to the entire liquid crystal panel. In addition, a high voltage of several hundred volts or more is required for lighting the fluorescent lamps, and an inverter is used as a power supply device for lighting.

In order to drive the fluorescent lamps with constant luminance, there is a need for control of an electric current so that a predetermined constant current flows to the fluorescent lamps. To this end, feedback control is performed for detecting a current flowing through the fluorescent lamps, causing the current to be fedback, and comparing the fedback current with the predetermined current. As shown in FIG. 1, in a conventional backlight inverter 30, a resistor is generally connected in series to a cold electrode 11 of each of fluorescent lamps 10 and one end of the resistor is connected to a common ground A so as to sense a current flowing through each of the fluorescent lamps. Therefore, one end or the cold electrode 11 of each of the fluorescent lamp 10 is connected to the common ground A through the resistor with a resistance value of about several hundred Ω (i.e. a voltage of almost zero is applied), and the other end or the hot electrode 12 of each of the fluorescent lamps 10 is connected to the backlight inverter 30 which supplies AC power having a high voltage (i.e. when an output voltage of the backlight inverter 30 is Vo, a voltage of almost Vo is applied to the other end of the fluorescent lamp 10) (hereinafter, referred to as "grounding method").

In each of the fluorescent lamps 10 of which the one end 11 is connected to the common ground A through the resistor with a resistance of about several hundred Ω as described above, since a fluorescent lamp reflector 20 and the one end or electrode 11 (generally referred to as "cold electrode") of the fluorescent lamp 10 are grounded to the common ground A as shown in FIG. 1, a stray capacitance B exists between the fluorescent lamp 10 and the grounded fluorescent lamp reflector 20. As a result, a leakage current path is formed through the stray capacitance B and the common ground A so that asymmetry is caused between the amount of current flowing toward the cold electrode connected to the common electrode A and the amount of current flowing toward the hot electrode which is opposite to the cold electrode. Accordingly, there is a problem in that luminance unbalance of the fluorescent lamp occurs since the side of the electrode 11 grounded to the common ground A is a little darker than the side of the electrode 12 which is opposite to the electrode 11.

This problem becomes more severe as the area of the liquid crystal panel becomes greater. Further, since the life of the side of the fluorescent lamp through which more current flows is rapidly shortened, there is a problem in that the life of the entire fluorescent lamp is shortened.

SUMMARY OF THE INVENTION

The present invention is conceived to solve the aforementioned problems. An object of the present invention is to provide a power supply device and a liquid crystal display device, wherein luminance of a fluorescent lamp is kept uniform and the life of the fluorescent lamp is prolonged by reducing a leakage current of the fluorescent lamp.

Another object of the present invention is to provide a power supply device, wherein a resistor for feedback is connected in series to one end of a fluorescent lamp to which voltages with different polarities are applied to both ends thereof, and voltages detected from both ends of the resistor are used as a feedback signal for controlling the driving of the fluorescent lamp.

A further object of the present invention is to provide a liquid crystal display device using a power supply device in which a resistor for feedback is connected in series to one end of a fluorescent lamp to which voltages with different polarities are applied to both ends thereof, and voltages detected from both ends of the resistor are used as a feedback signal for controlling the driving of the fluorescent lamp.

In order to achieve the above objects, a power supply device of the present invention comprises an oscillation control unit that controls output of an incoming DC source; a power driving unit that converts DC power output from the oscillation control unit into AC power; a power transforming unit that transforms the converted AC power; a sensing unit connected in series to one end of a lamp to sense a change of a power applied to the lamp; and a detection control unit that detects a difference in voltages at both ends of the sensing unit and provides a detected signal to the oscillation control unit.

A liquid crystal display device of the present invention comprises a lamp driving unit that converts DC power input into AC power, transforms the converted AC power, and provides the transformed AC power, and a light emitting unit including a lamp requiring AC power of a high voltage at at least one end of the lamp, and emitting light in response to the transformed AC power; wherein the lamp driving unit comprises an oscillation control unit that controls output of an incoming DC source; a power driving unit that converts DC power output from the oscillation control unit into AC power; a power transforming unit that transforms the converted AC power; a sensing unit connected in series to one end of the lamp to sense a change of a power applied to the lamp; and a detection control unit that detects a difference in voltages at both ends of the sensing unit and provides a detected signal to the oscillation control unit.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of a power supply device and a liquid crystal display device using the same according to the present invention will be described in detail with reference to the accompanying drawings.

Figure 1:
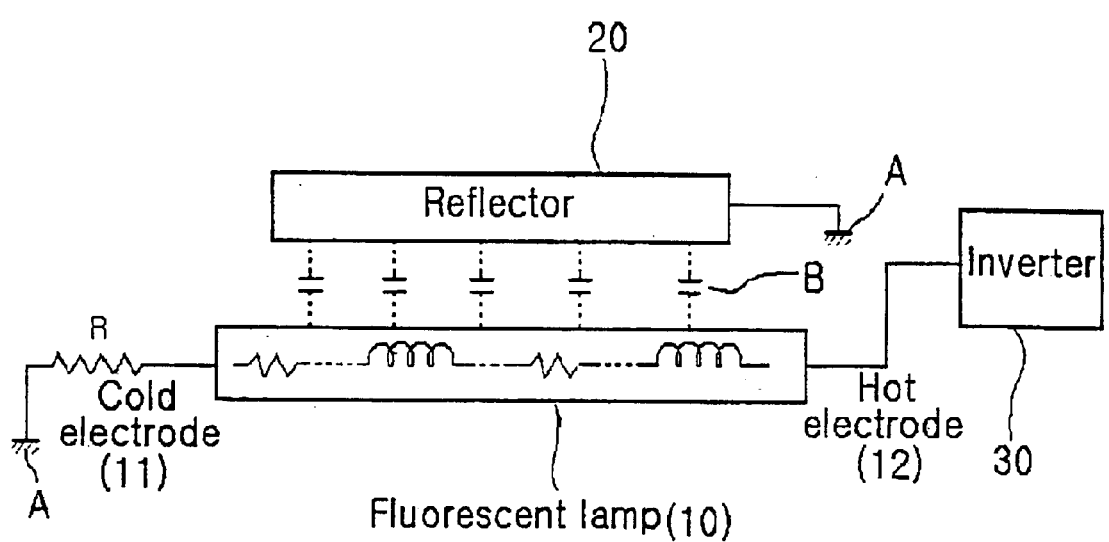
FIG. 1 shows a fluorescent lamp driven by a conventional grounding method.
Figure 2:
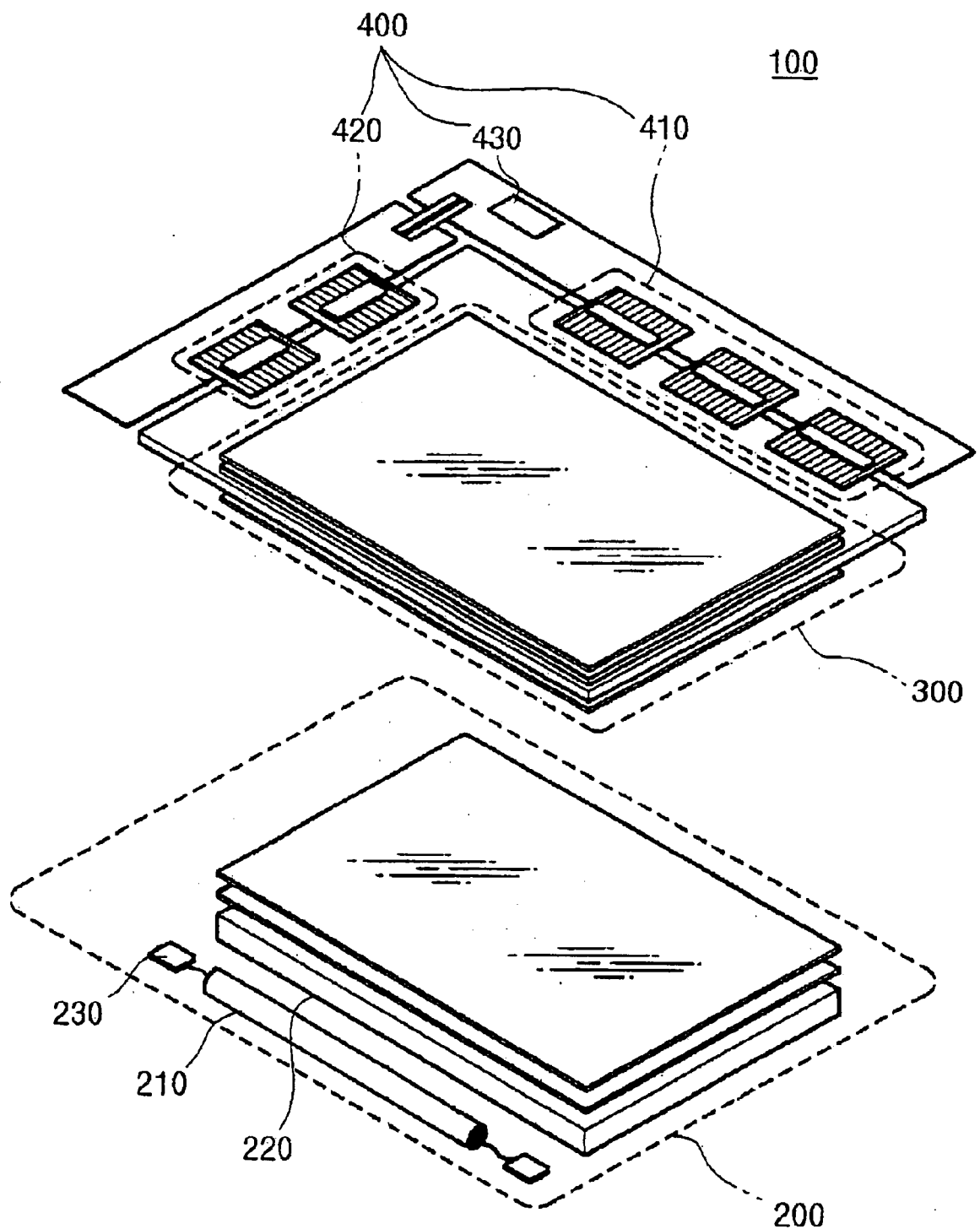
FIG. 2 is a view showing a configuration of a liquid crystal display device according to the present invention.

FIG. 2 shows a liquid crystal display device according to one embodiment of the present invention.

Referring to this figure, a liquid crystal display device 100 comprises a backlight 200 serving as a light source, a liquid crystal panel 300 in which liquid crystals are injected between two glass sheets, and a driving unit 400 including driving circuits 410, 420 that drive the liquid crystal panel 300 and a timing controller 430 that generates control signals for use in control of the driving circuits 410, 420. The liquid crystal display device 100 is used as a device in charge of a display function in a system such as a notebook computer, a television, or a monitor.

The backlight 200 comprises a fluorescent lamp 210, a reflector 220, and a lamp-driving unit (power supply device) 230 that applies a high voltage for driving the fluorescent lamp 210. The fluorescent lamp 210 used as the light source makes plane light having uniform brightness. A variety of fluorescent lamps such as a cold cathode fluorescent lamp (CCFL) or an external electrode fluorescent lamp (EEFL) can be used as the fluorescent lamp 210, and the reflector 220 functions to reflect light, which has been emitted from the fluorescent lamp 210, toward the liquid crystal panel 200 and may be omitted according to the structure of the backlight.

In the liquid crystal display device according to the embodiment of the present invention, since the fluorescent lamp 210 is not connected to a common ground of the liquid crystal display device to which the reflector 220 and the like are grounded, almost identical voltages with different polarities (i.e. +−Vo/2 and −+Vo/2) are applied from the lamp driving unit 230 to electrodes at both ends of the fluorescent lamp. Thus, since the high voltage applied to the electrodes at both the ends of the fluorescent lamp is reduced to about a half thereof as compared with the aforementioned grounding type fluorescent lamp, there are advantages in that a leakage current between the fluorescent lamp 210 and the reflector 220 is reduced, and luminance of the fluorescent lamp 210 becomes uniform since the voltages of almost identical magnitude (Vo/2) are applied to the electrodes at both the ends of the fluorescent lamp 210 even though the leakage current exists.

The liquid crystal panel 300 displays color images by controlling light, which has been generated when white plane light from the backlight 200 is incident on and permeates pixels, in response to respective pixel signal voltages input from the driving circuits 310 and 320. The lamp driving unit 230, i.e. the power supply device, will be described in detail below with reference to FIGS. 3 and 4.

Figure 3:
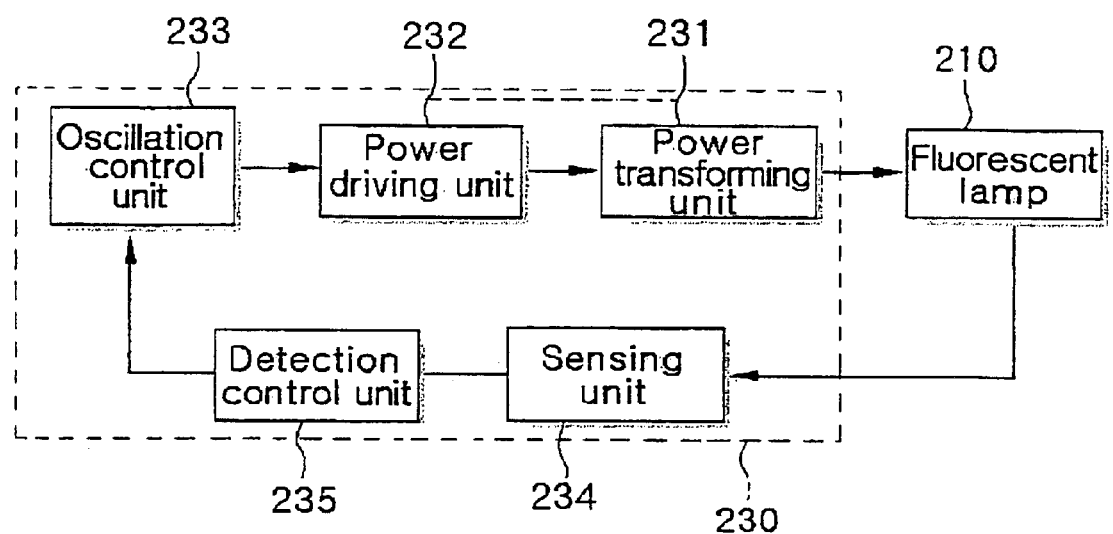
FIG. 3 is a block diagram illustrating a configuration of a power supply device according to the present invention.

FIG. 3 is a block diagram illustrating a configuration of a power supply device according to one embodiment of the present invention.

The lamp driving unit 230, i.e. the power supply device, according to the embodiment of the present invention comprises a power driving unit 232 that converts an input DC voltage (for example, 12V) into an AC pulse voltage by switching the input DC voltage, an oscillation control unit 233 that controls the switching operation of the power driving unit 232, and a power transforming unit 231 that boosts the AC pulse voltage output from the power driving unit 232 up to a high voltage of several hundred volts or more and provides the boosted voltage to the fluorescent lamp 210. The lamp driving unit 230 further comprises a sensing unit 234 connected in series to one end of the fluorescent lamp 210 to sense a change of a power applied to the fluorescent lamp 210, and a detection control unit 235 that detects a difference between voltages at both ends of the sensing unit 234 and provides a detected signal to the oscillation control unit 233.

The power driving unit 232 can be composed of a conventional bridge switching inverter or the like, and the power transforming unit 231 can be composed of a conventional winding-type transformer or the like. In addition, the oscillation control unit 233 can be composed of a conventional PWM control type exclusive IC or the like. The sensing unit 234 and the detection control unit 235 will be described in detail below with reference to FIG. 4.

Figure 4:
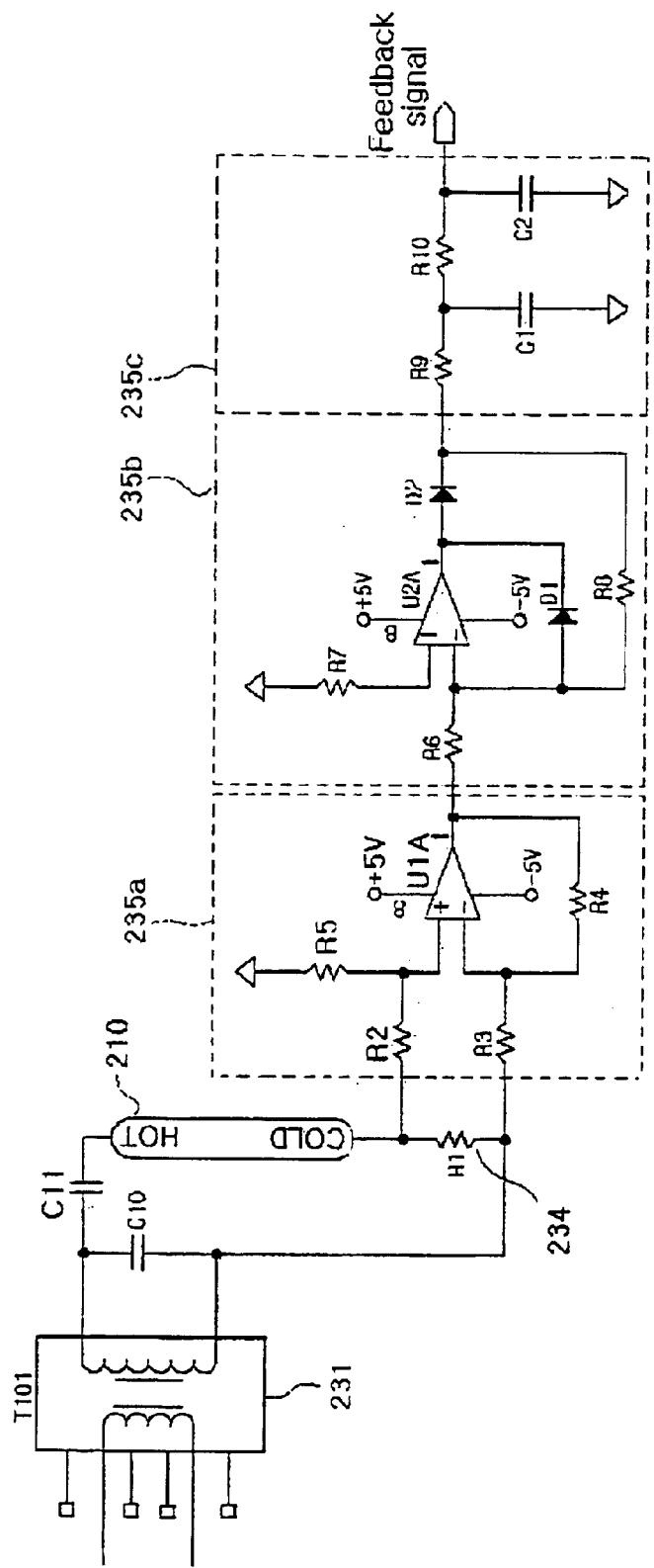
FIG. 4 is a feedback circuit diagram of the power supply device according to the present invention.

The sensing unit 234 of the power supply device 230 according to the embodiment of the present invention comprises an impedance device, i.e. a resistor R1, connected in series to the fluorescent lamp 210 as shown in FIG. 4. The detection control unit 235 comprises a voltage detection unit (in this embodiment, a differential operational amplifier) (235a) connected to both ends of the resistor R1 that detects a difference in AC voltages applied to both the ends of the resistor R1, a rectification unit 235b for half-wave or full-wave rectifying of the AC voltage detected by the voltage detection unit 235a, and a low pass filter unit 235c for filtering a low frequency component of the AC voltage rectified by the rectification unit 235b.

In the embodiment, since an AC voltage with a voltage magnitude proportional to the magnitude of the current flowing through the fluorescent lamp 210 is applied to both the ends of the resistor R1, the voltage magnitude at both the ends of the resistor R1 is used as the aforementioned feedback signal.

Figure 5:
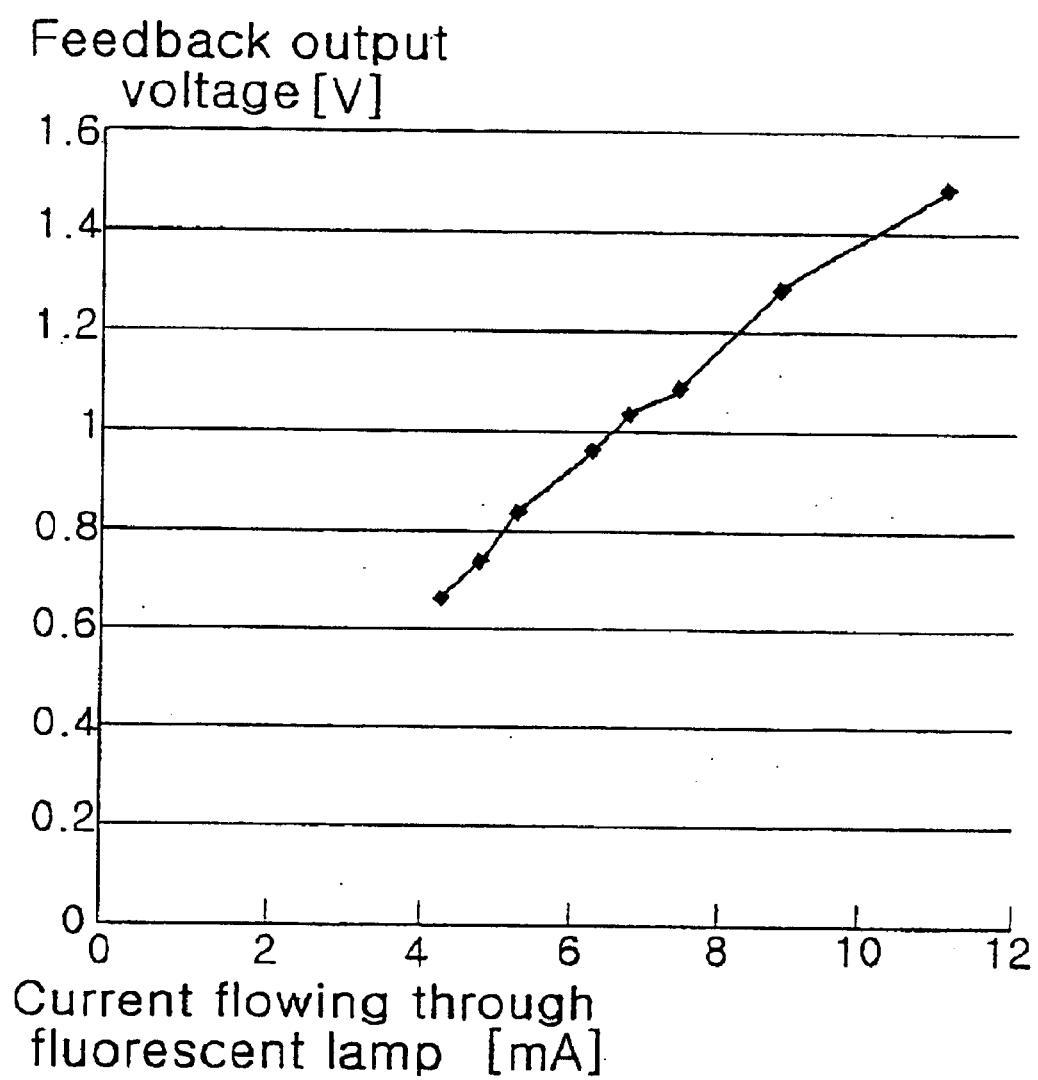
FIG. 5 is a graph showing that a feedback voltage proportional to a current flowing through a fluorescent lamp is output in the power supply device according to the present invention.

A DC voltage proportional to the magnitude of the AC voltage applied to both the ends of the resistor R1 is generated through the detection control unit 235. Finally, a DC voltage output from the low pass filter unit 235c is provided as a feedback signal to the oscillation control unit (233 in FIG. 3) of the power supply device. For reference, the DC voltage output from the low pass filter unit 235c is a DC voltage proportional to the current flowing through the fluorescent lamp 210 as shown in FIG. 5. Therefore, it can be understood that the DC voltage output from the low pass filter unit 235c can be used as the feedback signal for controlling the current of the fluorescent lamp 210.

In the configurations of the sensing unit 234 and the detection control unit 235 shown in FIG. 4, since one end of the resistor R1 is connected in series to the fluorescent lamp 210 and the other end thereof is connected to an output end of the power transforming unit 231, i.e. the transformer, the AC voltage proportional to the current flowing through the fluorescent lamp 210 is applied to both the ends of the resistor R1.

The differential operational amplifier 235a comprises an amplifier OP1 that receives the voltage applied to both the ends of the resistor R1 through resistors R2, R3, compares it with a reference signal decided by a resistor R5 to obtain a signal corresponding to a difference therebetween, and amplifies the difference signal; and a feedback resistor R4 of which one end is connected to an inverting terminal (−) of the differential operational amplifier OP1 and the other end is connected to an output end of the operational amplifier OP1. Therefore, the differential operational amplifier 235a detects the voltage at both the ends of the resistor R1, amplifies the voltage, and outputs the amplified voltage.

The rectification unit 235b receives the AC power output from the differential operational amplifier OP1 through a resistor R6, and half-wave or full-wave rectifies it. In the embodiment, the rectification unit 235b is a half-wave rectification operational amplifier consisting of resistors R7, R8, an amplifier OP2, and diodes D1, D2 as shown in FIG. 4. In addition, the low pass filter unit 235c consists of resistors R9, R10 and capacitors C1, C2 as shown in FIG. 4, and filters a low frequency component of the AC voltage rectified by the rectification unit 235b to convert the AC voltage into a DC voltage.

FIGS. 6(a) to (d) are views showing waveforms of output signals from the respective components upon operation of the sensing unit 234 and the detection control unit 235 shown in FIG. 4, wherein (a) shows a waveform of the voltage applied to both the ends of the resistor R1, (b) shows a waveform of the voltage output from the differential operational amplifier 235a, (c) shows a waveform of the voltage rectified through the rectification unit 235b, and (d) shows a waveform of the DC voltage obtained when the waveform of the voltage rectified by the rectification unit 235b is converted through the low pass filter unit 235c.

The operation of the sensing unit 234 and the detection control unit 235 constructed as such will be described with reference to FIGS. 5 and 6(a) to (d).

Figure 6:
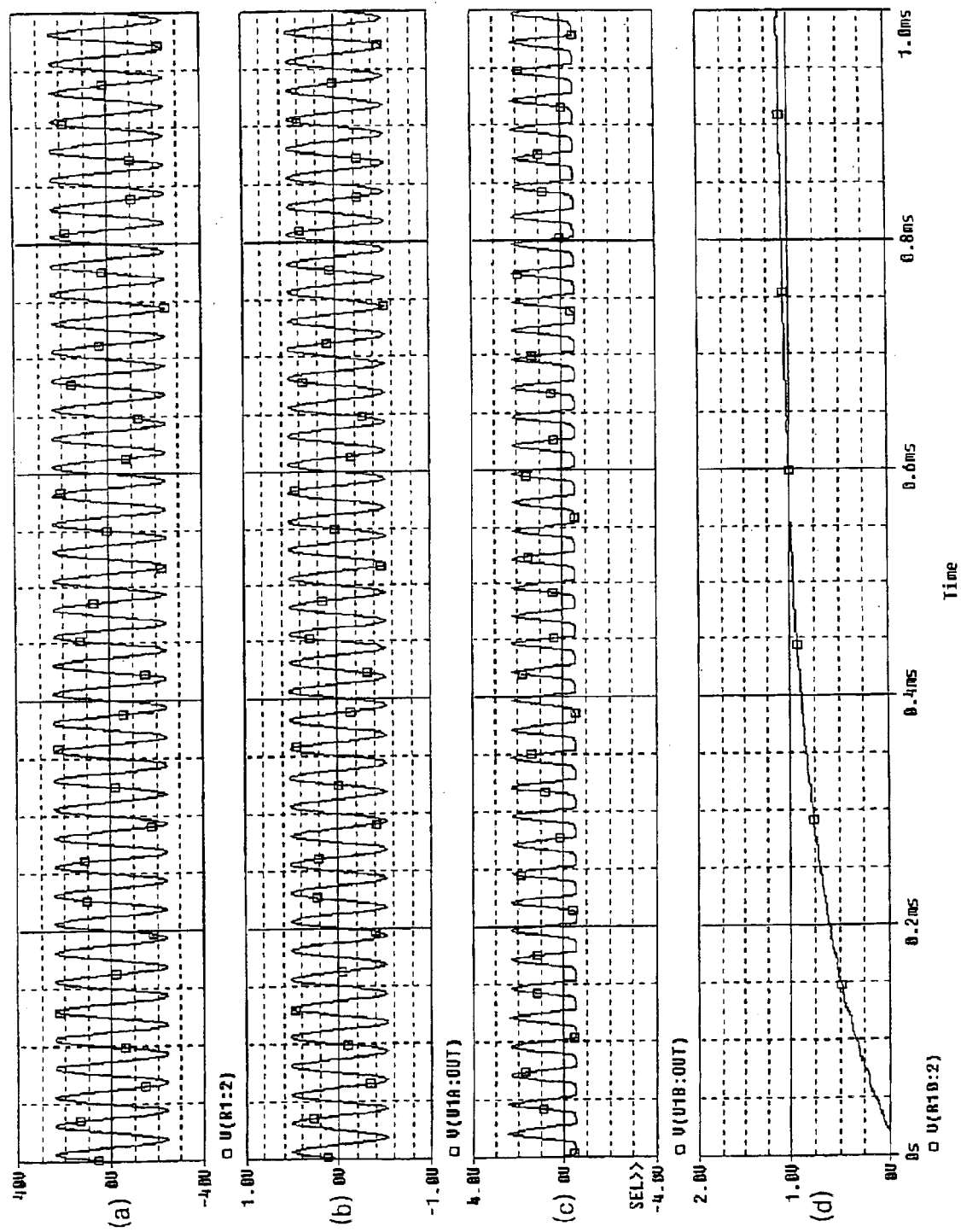
FIGS. 6(a) to (d) are views showing waveforms of output signals of the power supply device according to the present invention.

First, signals from both ends of the resistor R1 as shown in FIG. 6(a) are input to the differential operational amplifier 235a. The differential operational amplifier 235a performs subtraction between the signals input from both ends of the resistor R1, obtains the voltage difference between both ends of the resistor R1, and amplifies the voltage difference. The waveform of the voltage output from the differential operational amplifier 235a is the same as shown in FIG. 6(b). Here, since resistance of the input resistors R2, R3 of the differential operational amplifier 235a is generally several MΩ, i.e. 1 MΩ or more, the fluorescent lamp can be regarded as being electrically isolated from the detection control unit 235. Therefore, signal processing can be made by using only the voltage applied to the resistor R1 under the condition that neither one of the two ends of the fluorescent lamp 210 is grounded.

The signal output from the differential operational amplifier 235a is half wave rectified by the rectification unit 235b into the signal shown in FIG. 6(c) and then converted by the low pass filter unit 235c into the voltage with a DC component shown in FIG. 6(d).

Finally, the signal output from the low pass filter unit 235c is supplied as the feedback signal to the oscillation control unit 233 of the power supply device shown in FIG. 3, and this feedback signal is a signal proportional to the current flowing through the fluorescent lamp as shown in FIG. 5.

The power supply device and the liquid crystal display device using the same according to the present invention constructed as such can constantly drive the luminance of the fluorescent lamp with a desired control value by applying the voltages with different polarities to both the ends of the fluorescent lamp, detecting the voltage proportional to the current flowing through the fluorescent lamp under the condition that the electrode terminals of the fluorescent lamp are not connected to a common ground, and causing the detected voltage to be fedback to the oscillation control unit of the power supply device. Therefore, there are advantages in that the leakage current between the fluorescent lamp and the reflector is reduced and the luminance of the fluorescent lamp becomes uniform and the life of the fluorescent lamp is prolonged since the voltages of almost identical magnitudes are applied to both the ends of fluorescent lamp even if the leakage current exists.

Although the present invention has been described in connection with the preferred embodiments illustrated in the accompanying drawings, it should be understood that the present invention is not limited thereto and those skilled in the art can make various modifications and changes without departing from the scope of the invention. For example, the resistor R1 may be composed of predetermined impedance elements such as capacitors or inductors in which the voltage is produced at both ends thereof according to the current flowing therethrough, or a combination of capacitors, inductors, resistors and the like.

What is claimed is:

1. A power supply device, comprising:
   an oscillation control unit that controls output of an incoming DC source;
   a power driving unit that converts DC power output from the oscillation control unit into AC power;
   a power transforming unit that transforms the converted AC power;
   a sensing unit connected in series to one end of a lamp to sense a change of a power applied to the lamp; and
   a detection control unit that detects a difference in voltages at both ends of the sensing unit and provides a detected signal to the oscillation control unit.

2. The device as claimed in claim 1, wherein the detection control unit comprises a voltage detection unit that detects the voltages at both the ends of the sensing unit, and a rectification unit that rectifies the detected voltage.

3. The device as claimed in claim 2, wherein the voltage detection unit comprises a differential operational amplifier that detects and amplifies the voltage difference.

4. The device as claimed in claim 3, wherein the differential operational amplifier comprises resistors connected in parallel to both the ends of the sensing unit, and an operational amplifier that amplifies the voltage difference detected through the resistors.

5. The device as claimed in claim 4, wherein the resistors connected to both the ends of the sensing unit have resistance of 1 MΩ or more.

6. The device as claimed in claim 2, wherein the detection control unit further comprises a filter unit that performs low frequency filtering for an output of the rectification unit.

7. The device as claimed in claim 2, wherein the sensing unit comprises a resistor.

8. The device as claimed in claim 1, a voltage with positive polarity is applied to one end of the lamp, and a voltage with negative polarity is applied to the other end of the lamp.

9. The device as claimed in claim 1, wherein the lamp has one or two external electrode.

10. The device as claimed in claim 1, wherein the sensing unit comprises a resistor.

11. A liquid crystal display device, comprising:

a lamp driving unit that converts an incoming DC power into AC power, and transforms the converted AC power, and provides the transformed AC power; and a light emitting unit including a lamp requiring AC power of a high voltage at at least one end of the lamp, and emitting light in response to the transformed AC power;

wherein the lamp driving unit comprises:

an oscillation control unit that controls output of an incoming DC source;

a power driving unit that converts DC power output from the oscillation control unit into AC power;

a power transforming unit that transforms the converted AC power;

a sensing unit connected in series to one end of the lamp to sense a change of a power applied to the lamp; and a detection control unit that detects a difference in voltages at both ends of the sensing unit and provides a detected signal to the oscillation control unit.

12. The device as claimed in claim 11, wherein the detection control unit comprises a voltage detection unit that detects the voltages at both the ends of the sensing unit, and a rectification unit that rectifies the detected voltage.

13. The device as claimed in claim 12, wherein the voltage detection unit comprises a differential operational amplifier that detects and amplifies the voltage difference.

14. The device as claimed in claim 13, wherein the differential operational amplifier comprises resistors connected in parallel to both the ends of the sensing unit, and an operational amplifier that amplifies the voltage difference detected through the resistors.

15. The device as claimed in claim 14, wherein the resistors connected to both the ends of the sensing unit have resistance of 1 MΩ or more.

16. The device as claimed in claim 12, wherein the detection control unit further comprises a filter unit that performs low frequency filtering for an output of the rectification unit.

17. The device as claimed in claim 12, wherein the sensing unit comprises a resistor.

18. The device as claimed in claim 11, a voltage with positive polarity is applied to one end of the lamp, and a voltage with negative polarity is applied to the other end of the lamp.

19. The device as claimed in claim 11, wherein the lamp has one or two external electrode.

20. The device as claimed in claim 11, wherein the sensing unit comprises a resistor.

* * * * *